(12) United States Patent
Ohkado et al.

(10) Patent No.: US 6,668,276 B1
(45) Date of Patent: Dec. 23, 2003

(54) HTML FILE ACQUISITION METHOD, INFORMATION TERMINAL SUPPORT DEVICE, AND STORAGE MEDIUM FOR STORING A SOFTWARE PRODUCT FOR ACQUIRING HTML FILES

(75) Inventors: Akira Ohkado, Yokohama (JP); Akira Okada, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 699 days.

(21) Appl. No.: 09/636,160

(22) Filed: Aug. 10, 2000

(30) Foreign Application Priority Data

Aug. 10, 1999 (JP) .......................................... 11-226120

(51) Int. Cl.[7] .............................................. G06F 15/16
(52) U.S. Cl. ........................ 709/217; 709/203; 709/204; 709/205; 709/218; 709/219; 705/1; 705/35; 705/42
(58) Field of Search ................................ 709/203–205, 709/217–219; 705/1, 35, 42

(56) References Cited

U.S. PATENT DOCUMENTS

| | | | |
|---|---|---|---|
| 5,944,791 A | | 8/1999 | Scherpnier ................... 709/218 |
| 6,130,933 A | * | 10/2000 | Miloslavsky ............. 379/90.01 |
| 6,173,044 B1 | * | 1/2001 | Hortensius et al. ....... 379/93.09 |
| 6,212,192 B1 | * | 4/2001 | Mirashrafi et al. .......... 370/401 |
| 6,230,171 B1 | * | 5/2001 | Pacifici et al. .............. 715/512 |
| 6,240,444 B1 | * | 5/2001 | Fin et al. ..................... 709/205 |
| 6,259,774 B1 | * | 7/2001 | Miloslavsky ............. 379/90.01 |
| 6,298,356 B1 | * | 10/2001 | Jawahar et al. ............. 707/201 |
| 6,349,290 B1 | * | 2/2002 | Horowitz et al. ............. 705/35 |
| 6,370,508 B2 | * | 4/2002 | Beck et al. ..................... 705/1 |
| 6,373,836 B1 | * | 4/2002 | Deryugin et al. ........... 370/352 |
| 6,567,848 B1 | * | 5/2003 | Kusuda et al. .............. 709/219 |
| 2002/0194272 A1 | * | 12/2002 | Zhu ........................... 709/204 |

FOREIGN PATENT DOCUMENTS

| | | | | |
|---|---|---|---|---|
| JP | 10124461 | 5/1998 | .......... | G06F/15/00 |

* cited by examiner

*Primary Examiner*—Nabil El-Hady
(74) *Attorney, Agent, or Firm*—Gregory M. Doudnikoff

(57) ABSTRACT

The invention achieves internet-based collaboration without having to install collaboration software on one of the computer. For example, a customer of a bank would like to collaborate with an agent of the bank. The customer accesses an external web server via a collaboration server. The collaboration server replaces a transition destination URL of HTML code acquired according to a request from the customer with a character string including a host name for the collaboration server and transition destination identification information and sends this character string to the user. When the customer clicks a link, the actual URL to be acquired is specified from the transition destination identification information at the collaboration server, and this URL is acquired by proxy and returned to the customer's browser. A browser monitor program then monitors the agent's browser, the URL to actually be acquired is specified based on transition notification from the collaboration server and the same HTML code as for the customer is acquired.

6 Claims, 8 Drawing Sheets

FIG.4

SESSION MANAGEMENT TABLE 210

| SESSION ID 211 | AGENT ID 213 | CUSTOMER ID 215 | URL MANAGEMENT TABLE NUMBER 217 | AGENT COMMUNICATION PATH HANDLE 218 | RETURN URL 219 |
|---|---|---|---|---|---|
| 0001 | 01 | 2233 | 1 | 80102030 | www.xya.com/aaa.htm |
| 0003 | 02 | 0141 | 2 | 80507080 | |
| | | | | | |

FIG.5

URL MANAGEMENT TABLE 230

| URL ID 231 | URL HOST 233 | URL PATH 235 |
|---|---|---|
| 1 | www.xyz.com | aaa.htm |
| 2 | www.xyz.com | bbb.htm |
| | | |

FIG.6

RELOAD DETECTION TABLE 270

| SERIAL NO. 271 | USED FLAG 273 |
|---|---|
| 1 | N |
| 2 | Y |
| ⋮ | ⋮ |

FIG.7
AGENT MANAGEMENT TABLE 250
| AGENT ID 251 | LOGIN NAME 253 | STATUS 255 | INTERNAL LINE NUMBER 257 | ADDITIONAL INFORMATION 259 |
|---|---|---|---|---|
| 01 | SUZUKI1 | Ready | 1111 | |
| | | | | |
| | | | | |
| | | | | |
FIG.8
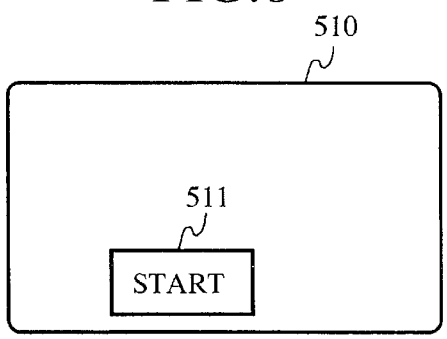
FIG.9
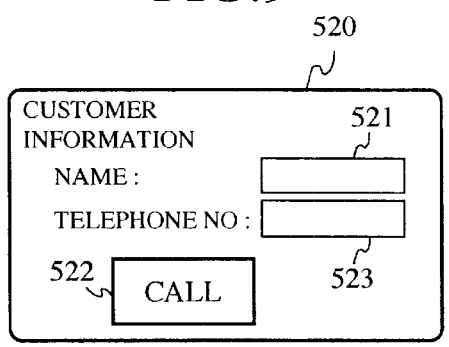
FIG.10
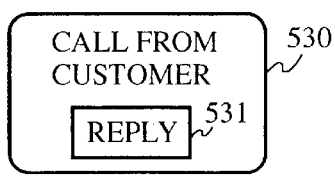

HTML FILE ACQUISITION METHOD, INFORMATION TERMINAL SUPPORT DEVICE, AND STORAGE MEDIUM FOR STORING A SOFTWARE PRODUCT FOR ACQUIRING HTML FILES

BACKGROUND OF THE INVENTION

1. Field of the Invention

This invention relates to an information processing method and more particularly relates to a method of carrying out common web page collaboration without installing special collaboration software on at least a client.

2. Description of the Related Art

At the time of applying for the present invention, there is provided, as described in Japanese Patent Laid-open Publication Hei. 10-124461, collaboration technology where cooperative work (reading, moving, and changing) relative to an HTML page can be carried out simultaneously by a number of users. FIG. 13 shows an example of this HTML page cooperative work applied to an internet banking system. In such a system, a bank agent, an internet customer consultation center agent, etc., at a system 1320 can refer to and operate on the same page as a customer at a system 1310.

It is, however, necessary to have collaboration software installed on the client system in related collaboration technology. The collaboration software therefore has to be written in code native to each particular platform on which it may operate which customers may have. Since this is not practical, this therefore limits the platforms and browsers that can be supported. This limitation usually does not present a problem with respect to collaboration by the agent, because the agent's system 1320 will typically be standardized and only require a single or a few versions, as there will be only a single or a few different platforms. However, customer systems will not be so homogeneous, as different customers will utilize different platforms and browsers. This represents a problem, as collaboration can not take place with customers that use platforms and browsers that are not supported.

SUMMARY OF THE INVENTION

It is therefore a first object of the present invention to provide a collaboration system capable of internet-based collaboration that does not require installation of collaboration software on a customer's system.

It is a further object of the present invention to provide a low cost collaboration system requiring fewer resources.

It is a still further object of the present invention to provide a collaboration system that is not dependent on the platform on which an information terminal operates.

A user accesses an external web server via a collaboration server. The collaboration server replaces a transition destination URL of HTML acquired according to a request from the user with a character string including a collaboration server host name and transition destination identification information and sends this character string to the user. When the customer clicks a link, the actual URL to be acquired is identified from the transition destination identification information at the collaboration server, and the collaboration server acquires this URL on behalf of the client and returns it to the browser on the customerside. A browser monitor program then monitors the browser on the agent side, the URL to actually be acquired is identified based on transition notification from the collaboration server and the same HTML as for the user is acquired.

In a first aspect of the present invention, there is provided an HTML file acquisition method executed in a system including an information terminal support device for receiving an HTML file acquisition request from a first information terminal equipped with an input device and a display device, acquiring an HTML file including content information corresponding to said HTML file acquisition request from a web server, and having a second information terminal display content corresponding to said content information, said HTML file acquisition method comprising the steps of (a) substituting a transition destination URL of an HTML file acquired by said information terminal support device for a replacement character string including a host name of said information terminal support device and transition destination identification information; (b) sending the HTML file whose transition destination URL was substituted to said first information terminal; (c) receiving, at said first information terminal, a transition destination HTML file acquisition request including said replacement character string created as a result of specification of said replacement character string; (d) acquiring transition destination identification information included in said transition destination HTML file acquisition request; (e) acquiring a transition destination HTML file including content information from a web server based on said transition destination identification information; (f) sending content information included in said transition destination HTML file to said first information terminal; and (g) sending information corresponding to said transition destination identification information to said second information terminal to display content corresponding to content information included in said transition destination HTML file at said second information terminal.

In the scope of the patent claims laid forth in the specification for this application, "content information" refers to information used to specify content, such as file name and path name, etc. "Content" refers to concepts including image information and character information, etc. The meaning of "transition destination identification information" includes information used in identification of transition destinations such as transition destination URLs or combinations of a transition source URL and information for specifying an element where an HTML acquisition request occurred (htm tag numbers, etc.), etc. "information corresponding to transition destination identification information" is a concept including information required to maintain collaboration such as transition destination identification information itself, or information translated under the predetermined rule.

In a further aspect of the present invention, there is provided an HTML file acquisition method executed in a system including an information terminal support device for receiving an HTML file acquisition request from a first information terminal equipped with an input device and a display device, acquiring an HTML file including content information corresponding to said HTML file acquisition request from a web server, and having a second information terminal display content corresponding to said content information, said HTML file acquisition method comprising the steps of (a) substituting a transition destination URL of an HTML file acquired by said information terminal support device for a replacement character string including a host name of said information terminal support device and transition destination identification information, and sending said HTML file to said first information terminal; (b) receiving, at said first information terminal, a transition destination HTML file acquisition request including said replacement character string created as a result of specification of said replacement character string; (c) acquiring transition destination identification information included in said transition destination HTML file acquisition request; and (d) sending information corresponding to said transition destination identification information to said second information terminal to display content corresponding to content information included in said transition destination HTML file at said second information terminal.

In another aspect of the present invention, there is provided an HTML file acquisition method executed in a system including an information terminal support device for receiving an HTML file acquisition request from a first information terminal equipped with an input device and a display device, acquiring an HTML file including content information corresponding to said HTML file acquisition request from a web server, and having a second information terminal display content corresponding to said content information, said HTML file acquisition method comprising the steps of (a) receiving a collaboration request from said first information terminal; (b) allocating said second information terminal to carry out collaboration with said first information terminal in reply to said collaboration request; (c) receiving an HTML file acquisition request from said first information terminal; (d) substituting a transition destination URL of an HTML file acquired by said information terminal support device for a replacement character string including a host name of said information terminal support device and transition destination identification information; (e) sending the HTML file whose transition destination URL was substituted to said first information terminal; (f) receiving, at said first information terminal, a transition destination HTML file acquisition request including said replacement character string created as a result of specification of said replacement character string; (g) acquiring transition destination identification information included in said transition destination HTML file acquisition request; (h) acquiring a transition destination HTML file including content information from a web server based on said transition destination identification information; (i) sending content information included in said transition destination HTML file to said first information terminal; and (j) sending information corresponding to said transition destination identification information to said second information terminal to display content corresponding to content information included in said transition destination HTML file at said second information terminal.

In another aspect of the invention, there is provided an information terminal support device for receiving an HTML file acquisition request from a first information terminal equipped with an input device and a display device, acquiring an HTML file including content information corresponding to said HTML file acquisition request from a web server, and having a second information terminal display content corresponding to said content information, said information terminal support device comprising: (a) an HTML translator for substituting a transition destination URL of an HTML file acquired by said information terminal support device for a replacement character string including a host name of said information terminal support device and transition destination identification information; (b) a web server for sending the HTML file whose transition destination URL was substituted to said first information terminal; (c) a HTML analyzer for, at said first information terminal, analyzing a transition destination HTML file acquisition request including said replacement character string created as a result of specification of said replacement character string and then transmitted, and acquiring transition destination identification information included in said transition destination HTML file acquisition request; (d) a cache manager for acquiring a transition destination HTML file including content information from a web server based on said transition destination identification information; and (e) an agent notifier for sending information corresponding to said transition destination identification information to said second information terminal to display content corresponding to content information included in said transition destination HTML file at said second information terminal.

In the scope of the patent claims laid forth in the specification for this application, "information terminal support server" is a concept that also includes proxy servers, etc. in addition to "collaboration servers" described in an embodiment following hereafter.

In a further aspect of the invention, there is provided an information terminal support device for receiving an HTML file acquisition request from a first information terminal equipped with an input device and a display device, acquiring an HTML file including content information corresponding to said HTML file acquisition request from a web server, and having a second information terminal display content corresponding to said content information, said information terminal support device comprising: (a) an agent allocator for allocating said second information terminal to carry out allocation with said first information terminal; (b) a session management table for managing a corresponding relationship of said first information terminal and said second information terminal; (c) an HTML translator for substituting a transition destination URL of an HTML file acquired by said information terminal support device for a replacement character string including a host name of said information terminal support device and transition destination identification information; (d) a web server for sending the HTML file whose transition destination URL was substituted to said first information terminal; (e) a HTML analyzer for, at said first information terminal, analyzing a transition destination HTML file acquisition request including said replacement character string created as a result of specification of said replacement character string and then transmitted, and acquiring transition destination identification information included in said transition destination HTML file acquisition request; (f) a cache manager for acquiring a transition destination HTML file including content information from a web server based on said transition destination identification information; and (g) an agent notifier for sending information corresponding to said transition destination identification information to said second information terminal to display content corresponding to content information included in said transition destination HTML file at said second information terminal.

In a still further aspect of the present invention, there is provided a storage medium for storing an HTML file acquisition program executed by a system including an information terminal support device for receiving an HTML file acquisition request from a first information terminal equipped with an input device and a display device, acquiring an HTML file including content information corresponding to said HTML file acquisition request from a web server, and having a second information terminal display content corresponding to said content information, said program comprising: (a) program code instructing said information terminal support device to substitute a transition destination URL of an HTML file acquired by said information terminal support device for a replacement character string including a host name of said information terminal support device and transition destination identification information; (b) program code instructing said information terminal support device to send an HTML file with a replaced transition destination URL to said first information terminal; (c) program code instructing said information terminal support device to, at said first information terminal, receive a transition destination HTML file acquisition request including said replacement character string created as a result of specification of said replacement character string; (d) program code instructing said information terminal support device to acquire transition destination identification information included in said transition destination HTML file acquisition request; (e) program code instructing said information terminal support device to acquire a transition destination HTML file including content information from a web server based on said transition destination identification information; (f) program code instructing said information terminal support device to send content information included in said transition destination HTML file to said first information terminal; and (g) program code instructing said information terminal support device to display content corresponding to content information included in said transition destination HTML file at said second information terminal by sending information corresponding to said transition destination identification information to said second information terminal.

In a further aspect of the present invention, there is provided a storage medium for storing an HTML file acquisition program executed by a system including an information terminal support device for receiving an HTML file acquisition request from a first information terminal equipped with an input device and a display device, acquiring an HTML file including content information corresponding to said HTML file acquisition request from a web server, and having a second information terminal display content corresponding to said content information, said program comprising: (a) program code instructing said information terminal support device to substitute a transition destination URL of an HTML file acquired by said information terminal support device for a replacement character string including a host name of said information terminal support device and transition destination identification information, and send said HTML file to said first information terminal; (b) program code instructing said information terminal support device to, at said first information terminal, receive a transition destination HTML file acquisition request including said replacement character string created as a result of specification of said replacement character string; (c) program code instructing said information terminal support device to acquire transition destination identification information included in said transition destination HTML file acquisition request; and (d) program code instructing said information terminal support device to display content corresponding to content information included in said transition destination HTML file at said second information terminal by sending information corresponding to said transition destination identification information to said second information terminal.

BRIEF DESCRIPTION OF THE DRAWINGS

FIG. 4 is a conceptual view of a session management table of the preferred embodiment of the present invention;

FIG. 5 is a conceptual view of a URL management table of the preferred embodiment of the present invention;

FIG. 6 is a conceptual view of a reload detection table of the preferred embodiment of the present invention;

FIG. 7 is a conceptual view of an entry management table of the preferred embodiment of the present invention;

FIG. 8 is a conceptual view showing an example of a collaboration start request panel displayed at a customer-side information terminal display screen of the preferred embodiment of the present invention;

FIG. 9 is a conceptual view showing an example of a customer information input panel displayed at the display screen of the customer-side information terminal of the preferred embodiment of the present invention;

FIG. 10 is a conceptual view showing an example of a collaboration reply panel displayed at a display screen of the agent side information terminal of the preferred embodiment of the present invention;

DESCRIPTION OF PREFERRED EMBODIMENT

A. Outline

The present invention will be discussed in terms of a customer who is utilizing a customer system or customer information terminal 130 and an agent, with whom the customer is collaborating, who is utilizing an agent system or agent information terminal 170. The terms "customer" and "agent" are employed for exemplary purposes only. A common scenario in which the present invention may be employed is one in which a company's customer who is online is attempting to collaborate with an employee or agent of the company. But the present invention is by no means limited to this scenario, but applies to any web-based collaboration between any individuals or groups of individuals.

Figure 1:
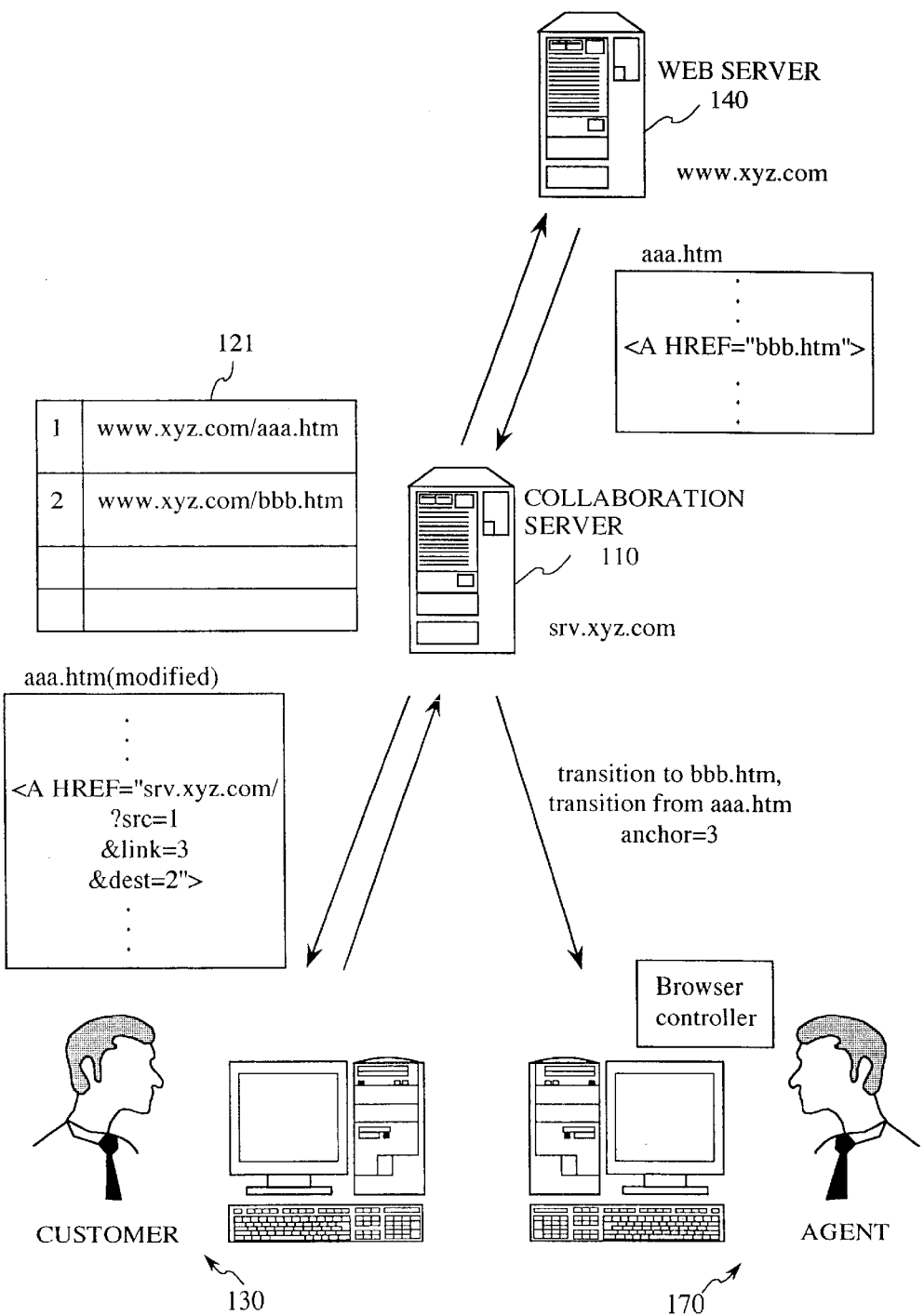
FIG. 1 is a view showing an outline of the present invention.

As shown in FIG. 1, a user accesses a web server 140 via a collaboration server 110. The collaboration server 110 acquires HTML code from the actual web server 140 in reply to requests from a user. The collaboration server 110 makes the following changes to the HTML code before transfer to the user.

The URL of the HTML code is registered in a URL management table 121 and an index is obtained (if the URL already exists in the table, an index is obtained). Relative numbers for each link included in the HTML code are then obtained, link target URLs are registered in the URL management table 121 and an index is acquired (if the URL already exists, that index is obtained). This can be done as follows:

replace a transition destination URL with <collaboration server host name>?<transition origin identification character string>=<html (transition origin) URL index>&<element identification character string>= <element number>&<link target identification character string>=<link target URL index>

In the example in FIG. 1, "href=http:www.xyz.com/bbb.htm" becomes "href=http:srv.xyz.com?src=1&&1ink=3&dest=2".

When a customer clicks on a link, "src", "link" and "desc" are taken in as parameters at the collaboration server 110, the frame where transition occurred is identified from "src", the clicked link is identified from "link" and the agent system 170 at which an agent is working who is collaborating with the customer is notified. The server 110 then determines the URL that is to actually be acquired based on "dest", acquires this URL on behalf of the customer and returns this URL to the browser of the customer system 130.

On the agent side, a browser monitor program monitors the browser. A frame causing a transition is determined based on the transition notification from the collaboration server 110 and generation of a click for the link of the specified number is caused causing the transition by clicking the link, synchronism is therefore possible whatever the "target" designation is.

When frames are not supported, a change can be made to information specifying the collaboration server and the URL to actually be acquired by making changes in such a manner as to give:

href=http:srv.xyz.com?dest=2

B. Hardware Configuration

Figure 2:
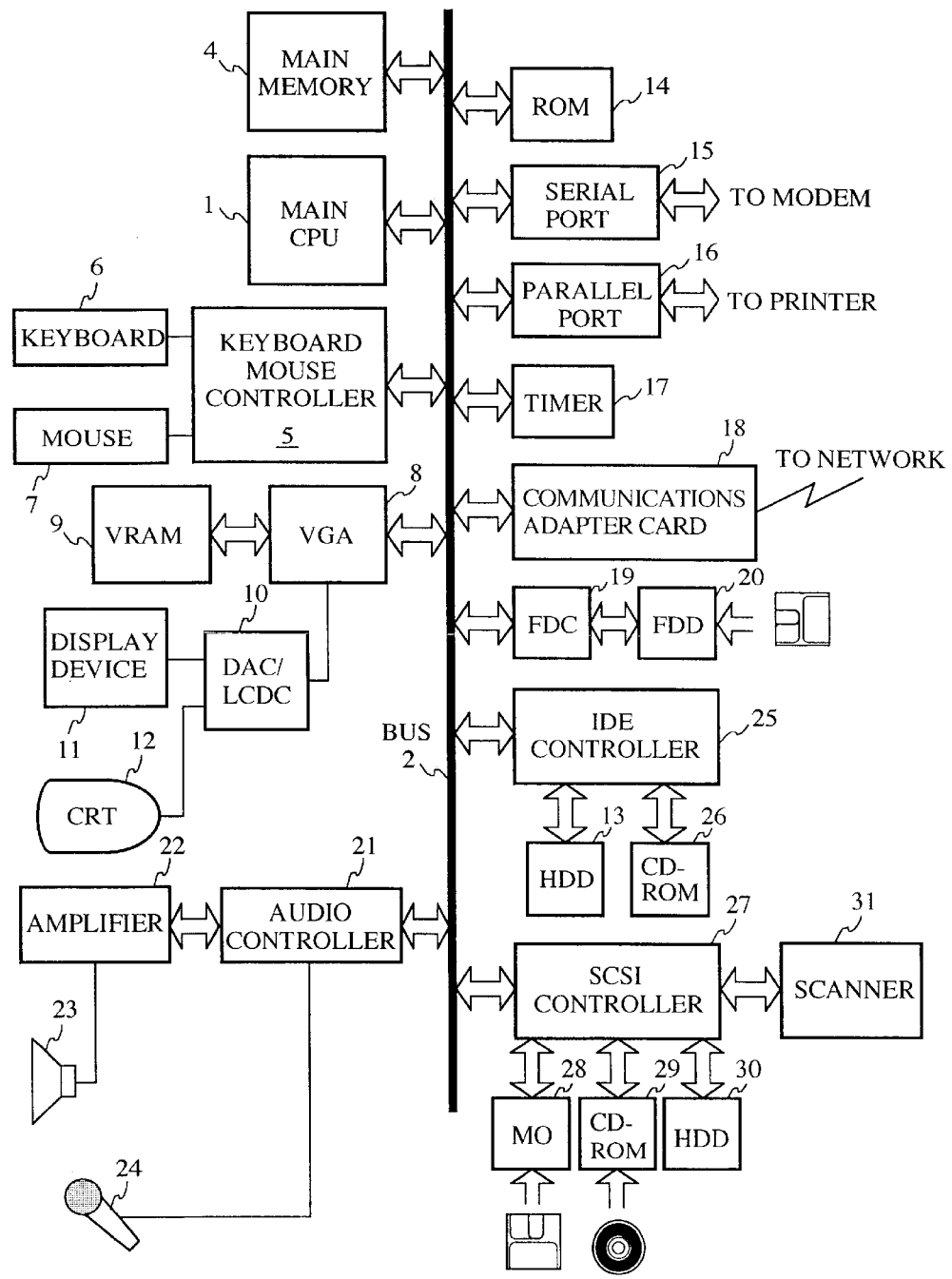
FIG. 2 is a block view showing an embodiment of a hardware configuration of a collaboration server or information terminal of the present invention.

FIG. 2 is an outline view showing an embodiment of a hardware configuration for a collaboration server 110 used in the present invention. The collaboration server 110 includes a Central Processing Unit (CPU) 1 and main memory 4. The CPU 1 and the memory 4 are connected via a bus 2 to an auxiliary storage device, such as a hard disc 13. A floppy disc device 20 (or a recording medium driver 26, 28 or 29 such as an MO or CD-ROM, etc.) is connected to the bus 2 via a floppy disc controller 19 (or IDE controller 25 or SCSI controller 27, etc.)

A floppy disc (or recording medium such as an MO or CD-ROM) is inserted into the floppy disc device 20 (or recording medium driver such as an MO or CD-ROM, etc.). From the floppy disc in the drive 20, the hard disc device 13 or ROM 14 can then be loaded with code for a computer program which will implement the present invention. The code provides instructions to the CPU in unison with the operating system so as to execute the present invention. Alternatively, the code can be downloaded from the network via a communications adapter card 18. This program is loaded into the memory 4 for execution. The code for this computer program can be compressed or can be recorded and/or distributed between a plurality of mediums.

The collaboration server 110 is equipped with user interface hardware that can comprise a pointing device 7, such as a mouse, joystick, etc., a keyboard 6 for inputting data, and a display 12 for presenting the user with visual data. The input means can also be a touch panel. It is also possible to connect a printer via a parallel port 16 or connect a modem via a serial port 15. The collaboration server 110 is connected to a network via the serial port 15 and the modem or the communications adapter card 18 (Ethernet or token ring card), etc. and is capable of communicating with other computers.

A speaker 23 receives an audio signal, D/A converted (Digital to Analog-converted) by an audio controller 21, via an amplifier 22 and outputs this signal as audio. An audio controller 21 A/D (Analog to Digital) converts audio information received from a microphone 24 so that audio information from outside the system can be taken in by the system.

It can be easily understood that the collaboration server 110 can be an information terminal having a communications function including one or a combination of a typical personal computer (PC), workstation, notebook PC, palmtop PC, network computer, etc. Such elements of the configuration are, however, only shown as an example, and all of these elements of the configuration are not elements of the configuration essential to the present invention.

In particular, in the hardware configuration described here, the audio controller 21, amplifier 22, speaker 23 and microphone 24 required for processing audio, the keyboard 6, mouse 7 and keyboard/mouse controller 5 enabling direct input from an operator, the CRT 12, display device 11, VRAM 9, and VGA 8 for presenting visual data to the user, and each of the recording medium processors 19, 25 and 27, etc. are not essential to the support of the information terminal and may be omitted.

Various modifications, such as combining each of the elements of the configurations of the collaboration server 110 over a number of machines and then executing these functions in a distributed manner, can easily be assumed by one skilled in the art and such concepts are considered to be included in the spirit and scope of the present invention.

An information terminal 130 used in the present invention can also be realized, as with the collaboration server 110, by the hardware configuration shown in FIG. 2, i.e., the information terminal 130 can also enable input of information requests and can issue and receive such requests. It can therefore be easily understood that the information terminal 130 can be realized by one or a combination of a typical personal computer (PC), a notebook PC, palmtop PC, various household products such as a television with a computer built-in, game machines having communications functions, or information terminals having communications functions including a telephone, FAX, portable telephone, Personal Handy System (PHS), electronic notebook, etc. However, these elements of the configuration are shown as an example, and all of these elements of the configuration are by no means essential to the present invention.

The operating system associated with the collaboration server 110 is by no means limited to a specific operating system environment, and can be an operating system supporting a GUI multi-window environment as standard, such as Windows NT, Windows 9x, Windows 3.x(Windows NT and Windows are trademarks of Microsoft Corporation), OS/2, MacOS (MacOS is a trademark of Apple Corporation), Linux (Linux is a trademark of Linus Torvalds), or the X-WINDOW system (X-WINDOW is a trademark of MIT) on AIX, a character-based environment such as PC-DOS (OS/2, AIX and PC-DOS are trademarks of the IBM Corporation) or MS-DOS (MS-DOS is a trademark of Microsoft Corporation), a real time OS such as VxWorks (VxWorks is a trademark of Wind River Systems, Inc.), or an operating system such as Java OS, etc., incorporated in a network computer (Java is a trademark of Sun Microsystems).

The operating system associated with the information terminal 130 is also by no means limited to a specific operating system environment, and can be an operating system supporting a GUI multi-window environment as standard, such as Windows NT, Windows 9x, Windows 3.x, OS/2, MacOS, Linux, or the X-WINDOW system on AIX, a character-based environment such as PC-DOS or MS-DOS, a real time OS such as VxWorks, or an operating system such as Java OS, etc., incorporated in a network computer.

C. System Configuration

Figure 3:
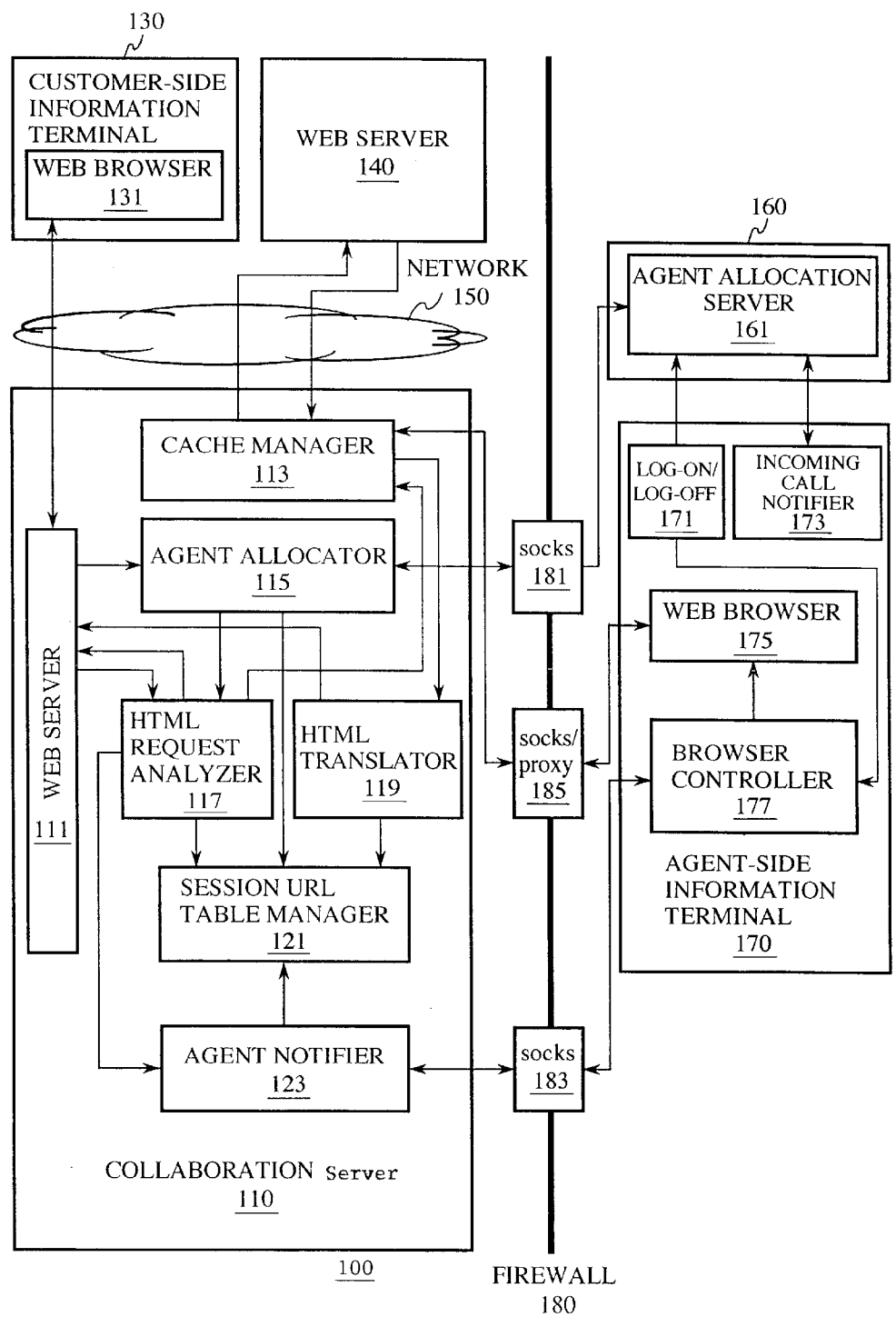
FIG. 3 is a block view of processing elements occurring in the preferred em bodiment of the present invention.

FIG. 3 is a functional block diagram showing a configuration of a collaboration system 100 including the collaboration server 110 of a preferred embodiment of the present invention.

The collaboration system 100 of the preferred embodiment of the present invention includes a customer information terminal 130, the collaboration server 110, the web server 140, an agent allocation server 160 and an agent information terminal 170.

The collaboration server 110 of the preferred embodiment of the present invention is equipped with a web server 111, a cache manager 113, an agent allocation client 115, an HTML request analyzer 117, an HTML translator 119, a session URL table manager 121 and an agent notifier 123.

At the collaboration server 110, an httpd function for first receiving and then replying to http requests is necessary. This can be implemented by the collaboration server 110 or can be incorporated into the web server by using an already existing web server such as the Netscape Enterprise Server or the Microsoft IIS. FIG. 3 shows the latter case.

The cache manager 113 caches HTML content (HTTP responses) for HTTP requests sent by the web browser 140. Control is carried out while two web browsers are being shared to ensure that the same HTML content is returned for HTTP requests sent from two web browsers.

According to the preferred embodiment of the present invention, the cache manager 113 is installed so that results outputted based on customer context can be displayed on the agent system 170. However, when frames are not supported, even without the cache manager 113, page alterations can be detected on the customer side and the same URL can be displayed on the agent system 170. The cache manager 113 is therefore not an element essential to the configuration with respect to this aspect of the present invention.

When a customer wants to initiate a collaborative session with an agent of the company, an agent allocation request is sent by a web browser 131 of the customer-side information terminal 130. The agent allocation client 115 acquires this request and asks the agent allocation server 161 to allocate an agent.

Components for managing agent allocation can be provided in the collaboration server 110. However, as shown in FIG. 3, the components for providing agent allocation can also be provided on a separate server 160, with just a agent allocation client 115, communicating with this separate server 160, then being provided within the collaboration server 110. The server for allocating agents can then be provided behind a firewall 180. This configuration provides superior security and is particularly useful regarding integration with a call center.

The HTML request analyzer 117 analyzes the contents of HTTP requests sent from the web browser 131 to the web server 140 based on a procedure of the present invention to be described later. In the preferred embodiment of the present invention, the HTML request analyzer 117 is capable of monitoring all HTTP messages passing through the web server 111 that are written using proxy server or web server APIs.

The session URL table manager 121 manages a session management table, a URL management table and a reload detection table. FIG. 4 provides a conceptual view of a session management table 210 of the preferred embodiment of the present invention. Information for session IDs 211, agent IDs 213, customer IDs 215, URL management table numbers 217, agent communication path handles 218 and return URLs 219 is managed at the session management table 210 of the present invention.

As shown in FIG. 5, a URL management table 230 according to the preferred embodiment of the present invention manages URL IDs 231, URL host names 233 and paths 235. The URL management table 230 decides unique numbers (URL ID 231) for specific URLs and is used to acquire actual URLs from these numbers.

The URL management table 230 can be used for all sessions, but special management for the lifetime of the entry can be omitted by creating a URL management table 230 for each session and by erasing the table upon completion of each session. In this case, a session management table specifying a URL management table from the session numbers is required each session. It is typical to store the agent ID, etc., and information relating to a collaboration session at the session management table 210.

FIG. 6 is a conceptual view of a reload detection table 270 according to the preferred embodiment of the present invention. As with the URL management table 230, the reload detection table 270 is created for every session. When the HTML request analyzer 117 acquires an HTML request, a used flag is set in a used flag column 273 which corresponds to a serial number found in a serial number column 271 included in this request. The HTML translator 119 allots a unique serial number to every translated, embedded URL. The HTML request analyzer 117 can then detect whether or not an HTML request designates a reload.

The agent notifier 123 notifies a browser controller 177 of the results of analysis by the HTML request analyzer 117 of the contents of an HTTP request sent from the web browser 131 to the web server based on a procedure of the present invention to be described hereafter.

The customer's web browser 131 and the agent's web browser 175 operate on the customer information terminal 130 and agent information terminal 170, respectively. The web browsers 131 and 175 designate URLs and send requests to web servers, and receive responses sent from the web server 140, which are then displayed on a display screen. In the drawings, the web server 140 is depicted as a single server to simplify the description, but the web browsers 131 and 175 are capable of sending HTML file acquisition requests to various web servers.

The browser controller 177 is provided at the agent's side information terminal 170. The browser controller 177 controls the web browser 175 based on information sent from the agent notifier 123.

When an agent logs on, a log on/log off controller 171 sends an agent log-in name and information terminal ID to the agent allocation server 161. The agent allocation server 161 maintains an agent management table of the type shown in FIG. 7 and registers an automatically created agent ID in an agent ID column 251 and agent log-in name in a log-in name column 253 in an agent management table 250. The agent management table 250 also includes a status column 250, on internal line number column 257 and an additional information column 259.

The agent allocation server 161 sets a status 255 to an initial value of "ready" in the agent management table 250 and also sets an internal line number 257 (a correspondence table is maintained internally) corresponding to an information terminal ID and additional information 259 corresponding to the log-in name. An additional information column 259 may contain information which identifies fields of specialization for each agent. This additional information can be used to determine whether an agent specializes in specific software, a prescribed type of desktop PC, or peripherals, such as printers, etc. An available agent having the appropriate skills can therefore be selected for customers who have a specific need when the agents may have skills that diverge over a wide range of fields.

When an agent logs off, the log on/log off controller 171 sends the agents log-in name to the agent allocation server 161 to give notification that the agent has logged off. The agent allocation server 161 then deletes the agent's entry from the agent management table 250. In the preferred embodiment of the present invention, an entry was made for the agent to the agent table 250 at the time of the agent's log-in. This entry is erased from the agent table 250 at the time of the agent's log-off. However, management can also be carried out by adding "Logoff" as a possible entry in the status column 255, in addition to "Ready" and "Busy", and by registering all agents in the table 250 beforehand.

When the agent allocation client 115 of the collaboration server 110 sends an agent allocation request to the agent allocation server 161, the agent allocation server 161 refers to the agent management table 250 and sends a response request to the information terminal of one of the agents for which the status is "ready".

An incoming call notifier 173 that receives this response request notifies the agent that there is a collaboration request from a customer. When the agent responds to the incoming call notifier 173, the agent allocation server 161 acquires this message, changes the agent's status in the status column 255 of the agent management table 250 to "Busy" and sends the ID of the responding agent back to the agent allocation client 115 of the collaboration server 110.

In the preferred embodiment of the present invention, the agent allocation server 161 and the agent's information terminal 170 are positioned behind the firewall 180 and exchange messages with the outside via socks servers 181 and 183, and a socks/proxy 185.

Each functional block shown in FIG. 3 is described above but these functional blocks are logical functional blocks. This does not necessarily mean that these functional blocks each have to be individually realized by hardware and software, and the functional blocks may be realized by combinations of hardware and software or by shared hardware and software. It also goes without saying that all of the functional blocks shown in FIG. 3 are not essential elements of the configuration of the present invention.

In particular, when the agent allocation server 161 and the agent information terminal 170 are not to be protected by a firewall, elements of the configuration such as the firewall 180, socks servers 181, 183, the socks/proxy 185, etc., are not necessary. Further, the cache manager 113 is not then an essential element, as described previously. The agent allocation server 161 can also be made unnecessary by giving the function of allotting agents to the collaboration server 110.

D. Operating Procedure

D-1. Starting Collaboration

The customer is guided so as to access the web server 140 via the collaboration server 110. In the preferred embodiment of the present invention, the customer is directly referred to the web server 140 prior to the start of collaboration. Referring now to FIG. 8, a window 510 is displayed to the customer which provides the customer with the option to initiate a collaboration session. The window 510 includes a start button 511 which the customer may select to initiate collaboration. When the start button 511 requesting collaboration is selected from the window 510, the customer terminal 130 is linked to the web server 111, and the customer sends a request to start collaboration to the collaboration server 110. When collaboration starts, the customer accesses the web server 140 via the collaboration server 110.

When the customer accesses the web server 140 via the collaboration server 110, a customer information input window 520 is displayed to the customer, and is shown in FIG. 9. Entry fields 521 and 523 for inputting a customer ID or name, telephone number, and the type of information desired by the customer are displayed in at the customer information input window 520. The customer enters this information in the entry fields and transmits the collaboration request by selecting a call button 522. The collaboration system treats the transmission as a request to allocate an agent for collaboration.

When a request to allocate an agent is sent by the web browser 131 of the customer information terminal 130, the agent allocation client 115 acquires this request and asks the agent allocation server 161 to allocate an agent. In response, the agent allocation server 161 refers to the agent management table 250 and sends a response request to the information terminal of one of the agents who has a status of "Ready" in the table 250.

In the preferred embodiment of the present invention, a customer ID or name, telephone number and the type of information desired by the customer (which were input by the customer) are included in an agent allocation request sent from the agent allocation client 115 to the agent allocation server 161. The agent allocation server 161 then accesses a customer management database (not shown), retrieves corresponding customer information and includes retrieved information in a response request sent to the incoming call notifier 173 so that the agent can have access to customer information (such as age, sex, history of past contacts) beforehand. When the customer is already in the database, a customer ID is acquired, and when the customer is not in the database, a customer ID is created for the customer. It is also possible for the agent allocation server 161 to assign a specific agent based on the type of information (contents of the customer question or request, etc.) desired by the customer.

Furthermore, it is also possible to send a call source URL when the start button 511 is selected, and embed this call source into a hidden field in the customer information window 520 using an application program on the collaboration server 110 and then pass this information over to the agent allocation client 115.

The incoming call notifier 173 receiving the response request then outputs a window 530 to the information terminal for the selected agent which indicates to the agent that there is a collaboration request from a customer. The window 530 which is displayed at the agent's information terminal 170 is shown in FIG. 10. When the agent accepts the collaboration request by selecting a reply button 531, the incoming call notifier 173 sends a "response complete message" to the agent allocation server 161. The agent allocation server 161 then acquires this response complete message, changes the status in the agent. management table 250 for the agent to "Busy", and sends the agent ID and customer ID sent in reply back to the agent allocation client 115 of the collaboration server 110.

The agent allocation client 115 that receives the agent ID and customer ID assigns this new collaboration a session ID and notifies the session URL table manager 121 of the session ID, agent ID and customer ID. In the preferred embodiment of the present invention, a return URL, which provides an address to which the customer's browser is to be returned to upon completion of collaboration, is also provided. The allocated session ID is transmitted to the browser 175 by the browser controller 177 as a cookie. This is originally sent to the customer browser 131 as a cookie at the time of setting up the initial screen.

The session URL table manager 121 registers the session ID, agent ID, customer ID and return URL in the appropriate column of a row of the session management table 210. A new URL management table 230 is then created and the number of this URL management table is recorded in the session management table 210.

The agent allocation server 161 designates the session ID and instructs the setting up of a session with the agent notifier 123 to the browser controller 177. In response, the browser controller 177 establishes a session with the agent notifier 123 via the socks server 183 and sets an agent communication path handle for the session in the column 218 of the session management table 210.

In order to shorten the response time when there are surplus resources, a communication path can be started in advance at the time the agent logs in so that just the session ID can be sent using an already established communication path when collaboration is started. In this case, a pool of established communication paths is maintained at the agent notifier 123, a communication path is pulled out from the pool when notification of a session ID is given and this communication path is set up at the session management table 210. An agent is then allocated and the agent allocation server 161 starts up a browser via the browser controller 177.

On the other hand, the agent allocation client 115 instructs the HTML request analyzer 117 to acquire an initial screen giving notification of the start of collaboration with the agent. The HTML request analyzer 117 then gives notification of the URL to be loaded at the agent notifier 123 and requests the cache manager 113 to acquire this page after registering the URL of the initial screen in the URL management table 230.

When the customer's browser 131 supports Java, it is preferable to associate applets with the customer information input screen 520 and implement the entry fields 521 and 523 and the call button 522 using applets. The status of progress during agent allocation, etc., can then be displayed to the customer by adding a status display area to the input screen 520 and implementing this via applets. The applets communicate with the agent allocation client 115 to determine the status, which is graphically displayed. In this case, when agent allocation is complete, the agent allocation client 115 notifies the applet of the completion of allocation and of the URL of the initial screen and the applets request the customer browser 131 to acquire the initial screen. The agent allocation client 115 then notifies the agent notifier 123 of the URL to be loaded.

D-2 HTML Translation

When an HTML request from the web server 140 is sent to the cache manager 113, the cache manager 113 delivers this HTML code to the HTML translator 119. The HTML translator 119 then translates the contents of the HTML code in accordance with the rules to be discussed relative to the flowchart of FIG. 11.

Figure 11:
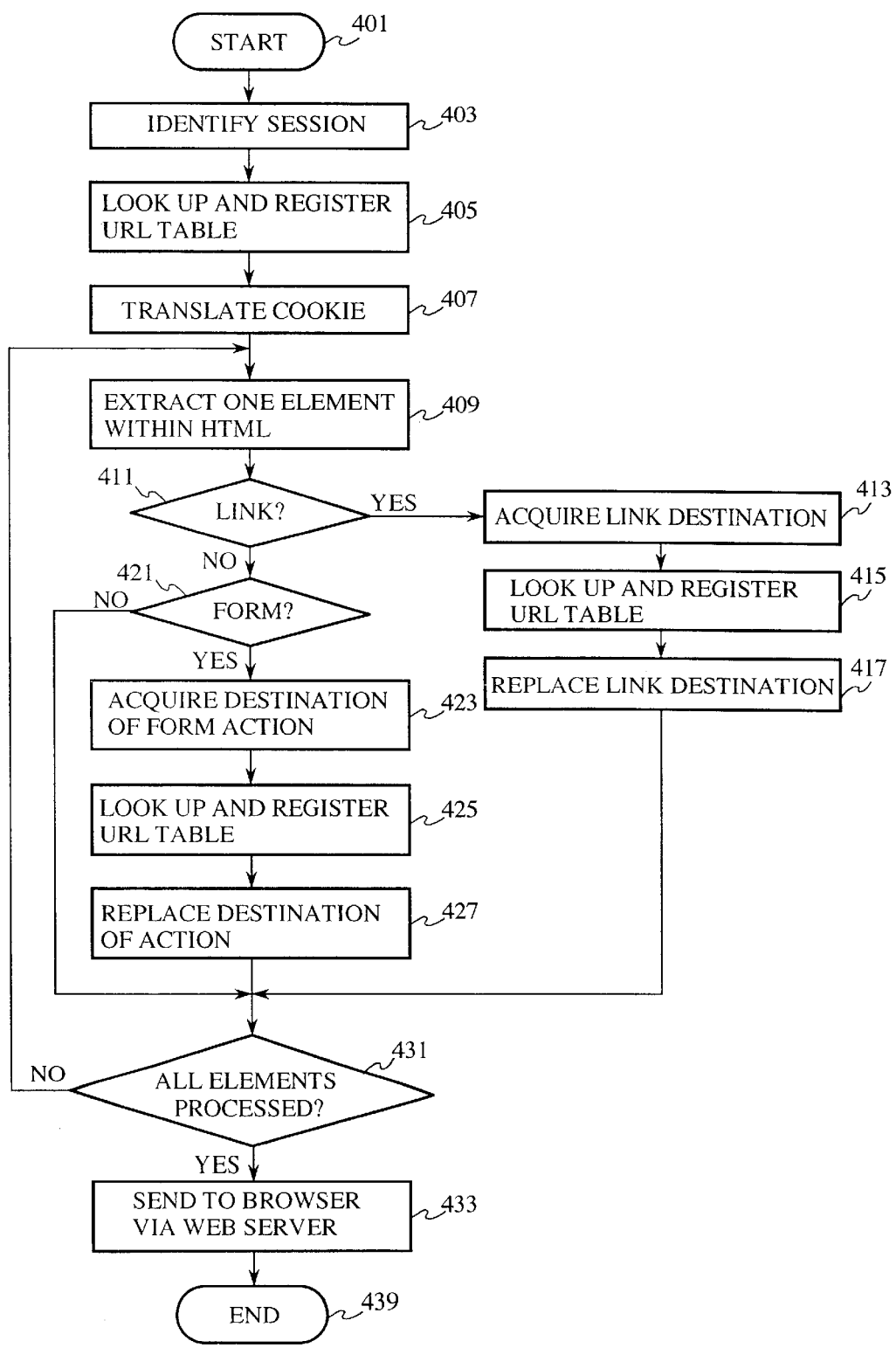
FIG. 11 is a flowchart showing a processing procedure of the preferred embodiment of the present invention.

Referring now to the flowchart of FIG. 11, when HTML code is returned to the http session corresponding to the HTML request, the session ID and request URL are determined from the HTML request, and the HTML translator 119 acquires a session number (Step 403).

The URL management table 230 for this session is then searched for using the URL of the returned HTML code itself. When this is not registered, a new URL ID is created and the URL is registered in the URL management table 230. The HTML translator 119 then acquires the URL ID (URL index) in the URL table 230 from the session URL table manager 121 as the results of the search (including newly registered URL Ids from the URL ID column 231) (Step 405).

When a cookie limited to the web server domain is present in the header of the returned HTML code but the domain does not include the collaboration server, this domain is translated to that of the collaboration server and the session ID is then set as a cookie (Step 407).

The returned HTML code is then analyzed, and a single element is first extracted and an element number is increased by one (Step 409). In the preferred embodiment of the present invention, the element number is increased by one per one HTML tag.

In Step 411, if the element is determined to be an anchor, processing proceeds to Step 413. In Step 421, if the element is determined to be a form, processing proceeds to Step 423. Following the subsequent processing for a link or a form, or immediately following Steps 411 and 421 if no link or form is determined to be present, a determination is then made as to whether or not an element is still present (Step 431). If an element is still present, processing returns to Step 409. If no elements are found to be present in Step 431, the translation is complete, and the translated HTML code is sent to the customer web browser 131 (Step 433).

D-2-2 Anchor Translation

When it is determined in Step 411 that the element is an anchor, a link target URL within the anchor tag is first acquired (Step 413). The URL table is then searched for the acquired URL. When the acquired URL is not registered, the acquired URL is newly registered. A table index is then returned (Step 415) as the search result (including newly registered URLs).

The new URL is created in accordance with the following rules and is made a link target (Step 417):

<collaboration server host name>/<identification character string>/<serial number>/<session number>/ <HTML URL index (transition source)>/<element number>/<link target URL index>.htm In this example "/" is used as a delimiter for each index number, but this kind of delimiter is not necessary when each index number is taken to be a fixed column number. Here, the identification character string is to identify that the URL requested by the HTML request analyzer 117 is not the actual URL, but the URL translated by the HTML translator 119 of the collaboration server 110.

The serial number is used to identify whether or not a customer requested the reload so that erroneous operation does not occur on the agent side of the collaboration when the customer presses the reload button. When the HTML request analyzer 117 acquires an HTML request, the used flag is set in the used flag column 273 of the reload detection table 270 relative to its associated serial number in the serial number column 271 included in this request. The HTML translator 119 assigns a unique serial number to each URL to be translated and embedded. The HTML request analyzer 117 can then detect whether or not the HTML request is a request designating a reload.

The session number is information specifying sessions between a customer and an agent. The link target URL index is information specifying the actual URL to be managed at the URL management table 230. When, for example, a link key word of a left side frame is clicked in the case where control is carried out to change the contents of the right side frame, the URL index of this HTML code (transition source) and the element number are used on the agent side of the collaboration system to identify which place has been clicked.

When, for example, the collaboration server host name is "www.colsvr.com", the identification character string is "REDIR", the serial number is 0001, the session number is 0003, the HTML code (transition source) URL index is 1, the element number is 4, and the link target URL index is 2, then before translation, the URL is "http:ww.company.com". After translation, the URL is "http:www.colsvr.com/REDIR/0001/003/1/4/2,htm".

When no form is found to be present in Step 4721 and thus no processing relative to and no supporting of forms (as shown in Steps 421 to 427) is necessary, then translation to a format normally used in CGI is possible, so as to give:

<collaboration server host name><virtual path name>?<serial number identification character string>=<serial number>&<session identification character string>=<session number>&<transition source identification character string>=<HTML(transition source) URL index>&<element identification character string>=<element number>&<link target identification character string>=<link target URL index>

When the collaboration server host name is "www.colsvr.com", the virtual path name is "srv", the serial number identification character string is "ser", the session identification character string is "ses", the transition source identification character string is "scr", the element identification character string is "link", and the link target identification character string is "dest", then before translation, the URL is "http:www.company.com". After translation, the URL is "http:www.colsvr.com/srv?ser=3&ses=3&src=1&link=4&dest+2".

D-2-3 Form Translation

When it is determined in Step 421 that the element is a form, first, a destination URL designated by ACTION within a form tag is acquired (Step 423). The URL table 230 is then searched for the acquired URL. If the URL has not yet been registered, then the URL is newly registered. The table index is then returned as the search results (including newly registered URLs) (Step 425).

The new URL is created in accordance with the following rules and is set at ACTION (Step 427):

<collaboration server host name>/<identification character string>/<serial number>/<session number>/<HTML (transition source) URL index>/<element number>/<link target URL index>.htm The identification character string, etc., are the same as described for anchor translation.

D-3 Analysis of HTML requests

Figure 12:
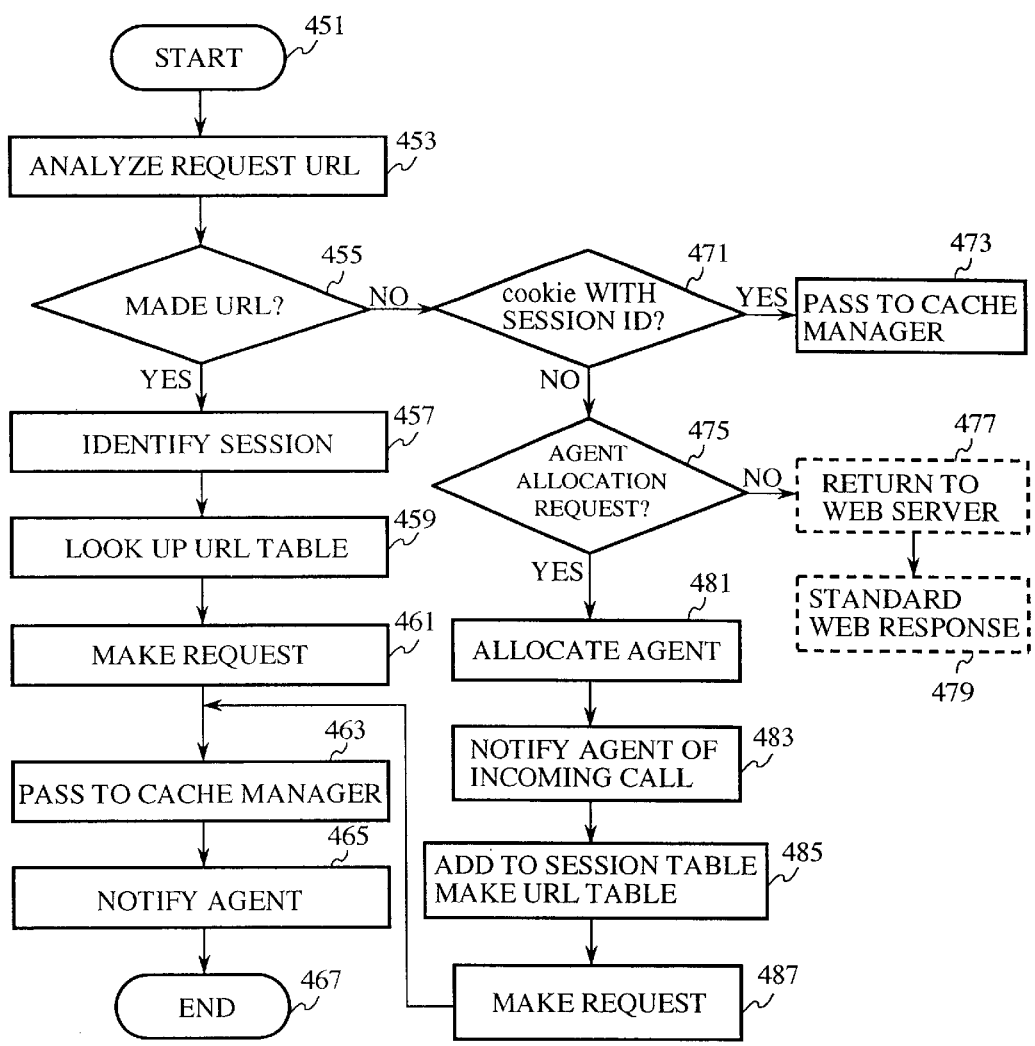
FIG. 12 is a flowchart showing a processing procedure of the preferred embodiment of the present invention.
Figure 13:
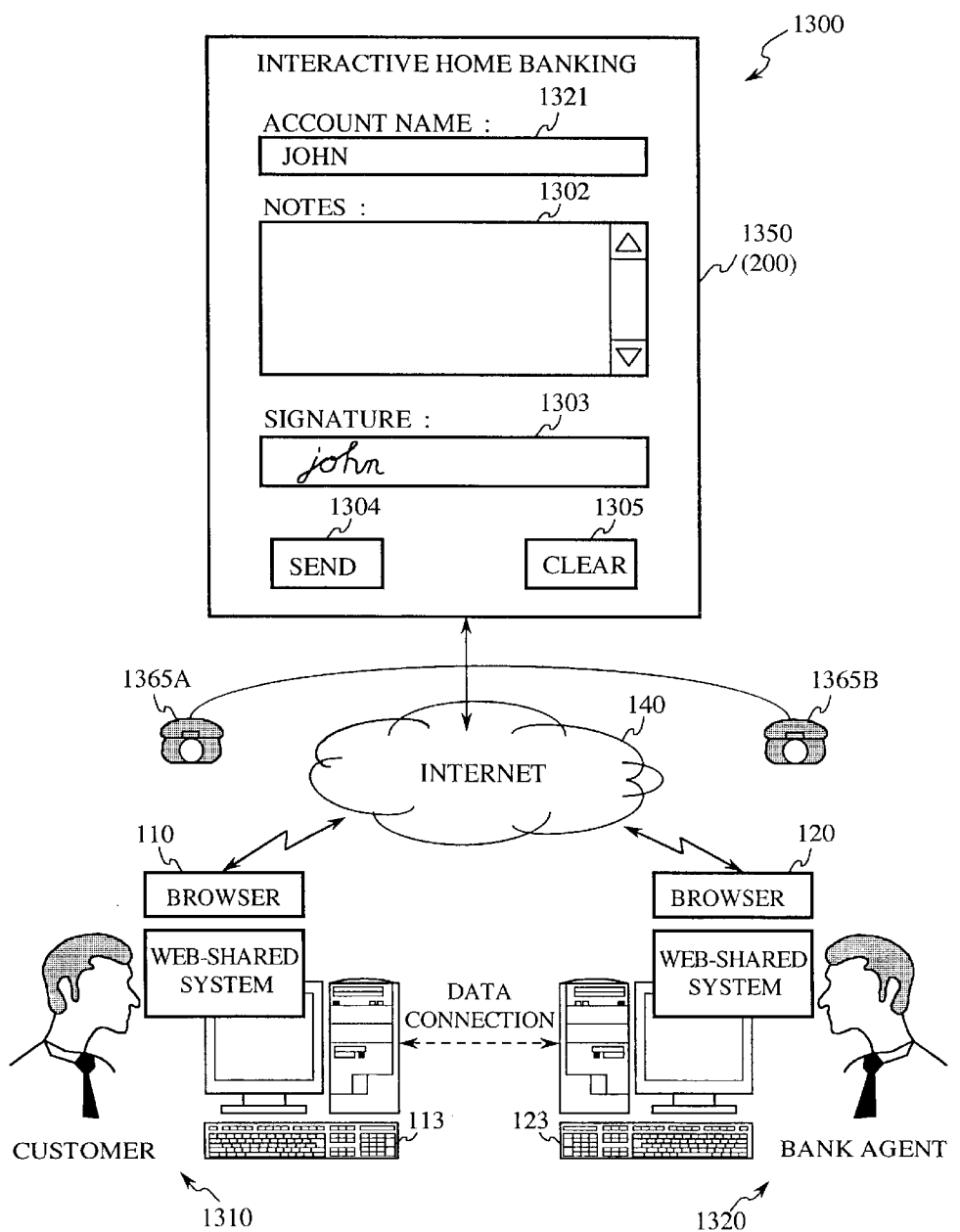
FIG. 13 is a view illustrating related collaboration technology.

When the customer clicks a link or submits a form at the customer's browser 131, the URL created as a result of the translation described in anchor translation or form translation is sent to the collaboration server 110 as a request. At the collaboration server 110, the HTML request analyzer 117 receives this request and carries out processing, which will now be described with reference to the flowchart of FIG. 12.

First, the HTML request analyzer 117 analyzes the requested URL and determines whether or not an identification character string for identifying whether or not to start the procedure of the present invention is present (Step 453). If the URL created was by the HMTL translator 119 (that is, if a prescribed identification character string is detected) in Step 455, then processing proceeds to Step 457. If the URL was not created by the HTML translator 119 (no prescribed identification string is detected in Step 455), then processing proceeds to Step 471.

If the URL was created as a result of HTML translation, the session ID can be acquired by analyzing the path (Step 457). The reload detection table 270 is then checked using the serial number and a determination is made as to whether or not this is a reload request. If it is determined that this is not a reload request, the URL table 230 to be used is determined from the session ID. The transition source URL and link target URL are requested from the URL index for the transition source URL and the link target URL (Step 459). When this request is determined to be a reload request, reload processing is carried out.

The requested URL is then translated to a real URL for the link target and the real URL is held until there is a reply from the cache manager 113. When the session ID is not included a header is added in the form of a cookie, a request to actually be sent to the web server 140 is made (Step 461) and this request is delivered to the cache manager 113 (Step 463).

The HTML request analyzer 117 notifies the agent notifier 123 of the session ID, transition source, element number and link target (the host name is replaced at the collaboration server when the cache manager 113 is used) (Step 465. The agent notifier 123 accesses the session URL table manager 121 and acquires the actual URL corresponding to the URL index.

The agent notifier 123 sends information for the transition source URL, the element number and the link target URL to the browser controller 177 resident in the agent's terminal 170 corresponding to this session ID based on the session ID. The agent controller 177 then identifies the place (frame) where a link operation is to be created and the element that is the source of the link operation based on this information and generates an action. In the preferred embodiment of the present invention, the link target is not used in times other than at the start of collaboration. When the element number is an invalid number (negative number), it is taken that the collaboration has started and the link target URL is used and displayed.

It is necessary for the agent browser 175 to support DOM defined by W3C or a corresponding function because it is necessary for the browser to create actions (clicks, submits) for links and forms of specified numbers within the HTML code. An example of such a browser would be Microsoft Internet Explorer 4.01.

The cache manager 113 acquires HTML code from the web server based on requests from the HTML request analyzer 117, keeps this HTML code in cache, and returns the results to the HTML translator 119. However, the requests from the agent always arrive after the requests from the customer's terminal 130. Requests from the agent terminal 170 are therefore not sent to the web server but instead the results already acquired and held by the cache manager are returned.

On the other hand, when it is determined that there is no identification character string (Step 455), a determination is made as to whether or not there is a cookie including a session ID in the header of the HTML request (Step 471). If there is a cookie, this is a request from an agent or a customer and this request is therefore delivered to the cache manager 113 (Step 473). The requested URL is held until there is a reply from the cache manager 113.

When it is determined in Step 471 that there is no cookie having the session ID, a check is made as to whether or not this request is an agent allocation request (Step 475), with this being decided by a specific path name. It is possible to add request parameters for agent allocation when it is wished to log on and log off using a web browser. When it is determined in Step 475 that this request is not an agent allocation request, a request is returned to the web server and the web server replies as a standard web request (Steps 477 and 479).

When it is determined in Step 475 that the request is an agent allocation request, processing proceeds to Step 481.

The agent allocation server 161 refers to the agent management table 250, calls an agent that is already logged on but is not yet in conversation with a customer and changes the status of that agent (Step 481), and indicates the arrival of a call to the agent information terminal 170 (Step 483).

When management of customer information is carried out, the customer information database is searched based on the customer number, telephone number, etc., and the customer ID is acquired. It is also, however, possible to display information inputted to a customer information page and information obtained by searching the customer information database based on this information in a collective manner.

When this system is integrated with a call center, this agent allocation is implemented as a CTI (Computer Telephone Integration) application and agent allocation is carried out at a CTI server. Incoming calls are then displayed using a CTI client installed at the agent information terminal. Customer information such as contact history, etc., collected by the CTI system can also be collectively displayed in addition to the incoming calls. When there is to be no integration with a call center, in the case of replying, a message can be displayed instructing an agent to manually call a customer.

When an agent clicks the reply button, a reply is returned regarding agent allocation and the allocation of an agent is decided upon. The agent allocation updates the status of the agent management table, allocates a new session ID, adds a new entry to the session management table, makes a new URL management table, and registers an initial URL in this table (Step 485). When information regarding the place at which the call button is pressed is handed over, this URL can be returned to after the end of collaboration by recording this information as the return URL of the session management table. (This is only for browsers that support redirection.) This URL is used as the initial URL.

In the case of integration with CTI where the customer inputs their telephone number, or in the case where a customer is identified from information such as a customer number and a telephone number is registered in a customer information database, a call can be made to this telephone number at this time from a Public Branch Exchange (PBX).

A session ID is added to a header in the form of a cookie, and a request that is actually sent to the web server is made (Step 487). A blank value is set for the transition source, an invalid value is set for the element number, the initial URL is set for the link target and processing proceeds to Step 463.

E. Others

In the above, a description is given using an example of the present invention applied to collaboration between a customer and agent at a customer support center. But the technology of the present invention can also be applied to one on one or other combinations of electronic conferencing.

As described above, according to the present invention, internet-based collaboration can take place without the need to install collaboration software on the client system.

What is claimed is:

1. An HTML file acquisition method executed in a computing environment including an information terminal support device for receiving an HTML file acquisition request from a first information terminal equipped with an input device and a display device, acquiring an HTML file including content information corresponding to the HTML file acquisition request from a web server, and having a second information terminal display content corresponding to the content information, said HTML file acquisition method comprising the steps of:

(a) substituting a transition destination URL of an HTML file acquired by said information terminal support device for a replacement character string including a host name of said information terminal support device and transition destination identification information;

(b) sending the HTML file whose transition destination URL was substituted to said first information terminal;

(c) receiving, at said first information terminal, a transition destination HTML file acquisition request including said replacement character string created as a result of specification of said replacement character string;

(d) acquiring transition destination identification information included in said transition destination HTML file acquisition request;

(e) acquiring a transition destination HTML file including content information from a web server based on said transition destination identification information;

(f) sending content information included in said transition destination HTML file to said first information terminal; and (g) sending information corresponding to said transition destination identification information to said second information terminal to display content corresponding to content information included in said transition destination HTML file at said second information terminal.

2. An HTML file acquisition method executed in a computing environment including an information terminal support device for receiving an HTML file acquisition request from a first information terminal equipped with an input device and a display device, acquiring an HTML file including content information corresponding to the HTML file acquisition request from a web server, and having a second information terminal display content corresponding to the content information, said HTML file acquisition method comprising the steps of:

(a) substituting a transition destination URL of an HTML file acquired by said information terminal support device for a replacement character string including a host name of said information terminal support device and transition destination identification information, and sending said HTML file to said first information terminal;

(b) receiving, at said first information terminal, a transition destination HTML file acquisition request including said replacement character string created as a result of specification of said replacement character string;

(c) acquiring transition destination identification information included in said transition destination HTML file acquisition request; and (d) sending information corresponding to said transition destination identification information to said second information terminal to display content corresponding to content information included in said transition destination HTML file at said second information terminal.

3. An HTML file acquisition method executed in a computing environment including an information terminal support device for receiving an HTML file acquisition request from a first information terminal equipped with an input device and a display device, acquiring an HTML file including content information corresponding to said HTML file acquisition request from a web server, and having a second information terminal display content corresponding to the content information, said HTML file acquisition method comprising the steps of:

(a) receiving a collaboration request from said first information terminal;

(b) allocating said second information terminal to carry out collaboration with said first information terminal in reply to said collaboration request;

(c) receiving an HTML file acquisition request from said first information terminal;

(d) substituting a transition destination URL of an HTML file acquired by said information terminal support device for a replacement character string including a host name of said information terminal support device and transition destination identification information;

(e) sending the HTML file whose transition destination URL was substituted to said first information terminal;

(f) receiving, at said first information terminal, a transition destination HTML file acquisition request including said replacement character string created as a result of specification of said replacement character string;

(g) acquiring transition destination identification information included in said transition destination HTML file acquisition request;

(h) acquiring a transition destination HTML file including content information from a web server based on said transition destination identification information;

(i) sending content information included in said transition destination HTML file to said first information terminal; and (j) sending information corresponding to said transition destination identification information to said second information terminal to display content corresponding to content information included in said transition destination HTML file at said second information terminal.

4. An information terminal support device for receiving an HTML file acquisition request from a first information terminal equipped with an input device and a display device, acquiring an HTML file including content information corresponding to said HTML file acquisition request from a web server, and having a second information terminal display content corresponding to said content information, said information terminal support device comprising:

(a) an HTML translator for substituting a transition destination URL of an HTML file acquired by said information terminal support device for a replacement character string including a host name of said information terminal support device and transition destination identification information;

(b) a web server for sending the HTML file whose transition destination URL was substituted to said first information terminal;

(c) an HTML analyzer for, at said first information terminal, analyzing a transition destination HTML file acquisition request including said replacement character string created as a result of specification of said replacement character string and then transmitted, and acquiring transition destination identification information included in said transition destination HTML file acquisition request;

(d) a cache manager for acquiring a transition destination HTML file including content information from a web server based on said transition destination identification information; and (e) an agent notifier for sending information corresponding to said transition destination identification information to said second information terminal to display content corresponding to content information included in said transition destination HTML file at said second information terminal.

5. Computer readable code stored on media including an HTML file acquisition program executed in a computing environment including an information terminal support device for receiving an HTML file acquisition request from a first information terminal equipped with an input device and a display device, acquiring an HTML file including content information corresponding to said HTML file acquisition request from a web server, and having a second information terminal display content corresponding to said content information, said computer readable code comprising:

(a) program code for instructing said information terminal support device to substitute a transition destination URL of an HTML file acquired by said information terminal support device for a replacement character string including a host name of said information terminal support device and transition destination identification information;

(b) program code for instructing said information terminal support device to send an HTML file with a replaced transition destination URL to said first information terminal;

(c) program code for instructing said information terminal support device to, at said first information terminal, receive a transition destination HTML file acquisition request including said replacement character string created as a result of specification of said replacement character string;

(d) program code for instructing said information terminal support device to acquire transition destination identification information included in said transition destination HTML file acquisition request;

(e) program code for instructing said information terminal support device to acquire a transition destination HTML file including content information from a web server based on said transition destination identification information;

(f) program code for instructing said information terminal support device to send content information included in said transition destination HTML file to said first information terminal; and (g) program code for instructing said information terminal support device to display content corresponding to content information included in said transition destination HTML file at said second information terminal by sending information corresponding to said transition destination identification information to said second information terminal.

6. Computer readable code stored on media including an HTML file acquisition program executed by a system including an information terminal support device for receiving an HTML file acquisition request from a first information terminal equipped with an input device and a display device, acquiring an HTML file including content information corresponding to said HTML file acquisition request from a web server, and having a second information terminal display content corresponding to said content information, said program comprising:

(a) program code for instructing said information terminal support device to substitute a transition destination URL of an HTML file acquired by said information terminal support device for a replacement character string including a host name of said information terminal support device and transition destination identification information, and send said HTML file to said first information terminal;

(b) program code for instructing said information terminal support device to, at said first information terminal, receive a transition destination HTML file acquisition request including said replacement character string created as a result of specification of said replacement character string;

(c) program code for instructing said information terminal support device to acquire transition destination identification information included in said transition destination HTML file acquisition request; and (d) program code for instructing said information terminal support device to display content corresponding to content information included in said transition destination HTML file at said second information terminal by sending information corresponding to said transition destination identification information to said second information terminal.

* * * * *